(12) United States Patent
Trainin et al.

(10) Patent No.: US 9,859,966 B2
(45) Date of Patent: Jan. 2, 2018

(54) APPARATUS, SYSTEM AND METHOD OF BEAMFORMING

(71) Applicant: INTEL CORPORATION, Santa Clara, CA (US)

(72) Inventors: Solomon B. Trainin, Haifa (IL); Assaf Kasher, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 173 days.

(21) Appl. No.: 14/748,275

(22) Filed: Jun. 24, 2015

(65) Prior Publication Data

US 2016/0119046 A1  Apr. 28, 2016

Related U.S. Application Data

(60) Provisional application No. 62/068,032, filed on Oct. 24, 2014.

(51) Int. Cl.
*H04W 74/00* (2009.01)
*H04B 7/06* (2006.01)
*H04W 74/04* (2009.01)
*H04W 16/28* (2009.01)

(52) U.S. Cl.
CPC ......... *H04B 7/0617* (2013.01); *H04W 16/28* (2013.01); *H04W 74/04* (2013.01)

(58) Field of Classification Search
CPC ..... H04B 7/0617; H04W 16/28; H04W 74/04
See application file for complete search history.

(56) References Cited

U.S. PATENT DOCUMENTS

| | | | | |
|---|---|---|---|---|
| 8,223,639 B2 * | 7/2012 | Seok | ................. | H04W 74/0816 370/230 |
| 8,509,130 B2 * | 8/2013 | Liu | ...................... | H04B 7/0695 342/367 |
| 8,705,562 B2 * | 4/2014 | Kim | ................. | H04W 72/1273 370/310 |
| 9,288,757 B2 * | 3/2016 | Trainin | ............. | H04W 52/0216 |
| 9,331,754 B2 * | 5/2016 | Kwon | .................. | H04B 7/0408 |
| 9,655,144 B2 * | 5/2017 | Seok | ..................... | H04W 74/04 |

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Ahmed Elallam
(74) *Attorney, Agent, or Firm* — Shichrur & Co.

(57) ABSTRACT

Some demonstrative embodiments include apparatuses, devices, systems and methods of beamforming. For example, a first wireless station may process transmission of a first plurality of Beam Refinement Phase (BRP) frames to a second wireless station during a BRP, one or more duration fields of one or more respective BRP frames of the first plurality of BRP frames being according to an end time; and may process reception of a second plurality of BRP frames from the second wireless station during the BRP, one or more duration fields of one or more respective BRP frames of the second plurality of BRP frames being according to the end time.

25 Claims, 6 Drawing Sheets

(56) References Cited

U.S. PATENT DOCUMENTS

| | | | | |
|---|---|---|---|---|
| 2010/0214169 A1* | 8/2010 | Kafle | H01Q 3/26 | 342/368 |
| 2010/0215027 A1* | 8/2010 | Liu | H04B 7/0695 | 370/338 |
| 2010/0265925 A1* | 10/2010 | Liu | H04B 7/0617 | 370/336 |
| 2011/0080898 A1* | 4/2011 | Cordeiro | H04B 7/0617 | 370/338 |
| 2011/0149842 A1* | 6/2011 | Cordeiro | H04B 7/0491 | 370/328 |
| 2012/0009880 A1* | 1/2012 | Trainin | H04W 24/00 | 455/67.11 |
| 2012/0250670 A1* | 10/2012 | Cordeiro | H04B 7/0491 | 370/338 |
| 2013/0089000 A1* | 4/2013 | Hansen | H04B 7/0851 | 370/254 |
| 2013/0115887 A1* | 5/2013 | Kwon | H04B 7/0408 | 455/63.4 |
| 2013/0329718 A1* | 12/2013 | Liu | H04B 7/0695 | 370/338 |
| 2014/0011445 A1* | 1/2014 | Trainin | H04W 24/00 | 455/39 |
| 2014/0146751 A1* | 5/2014 | Jiang | H04L 1/0027 | 370/328 |
| 2014/0161105 A1* | 6/2014 | Cordeiro | H04B 7/0617 | 370/336 |
| 2014/0177543 A1* | 6/2014 | Cordeiro | H04B 7/0623 | 370/329 |
| 2014/0369330 A1* | 12/2014 | Sinha | H04W 8/005 | 370/338 |
| 2015/0071051 A1* | 3/2015 | Zhu | H04W 72/121 | 370/216 |
| 2015/0288427 A1* | 10/2015 | Wang | H04W 72/1273 | 370/329 |
| 2015/0289147 A1* | 10/2015 | Lou | H04B 7/0408 | 370/329 |
| 2016/0205627 A1* | 7/2016 | Zhu | H04W 52/0216 | 370/311 |

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

* cited by examiner

APPARATUS, SYSTEM AND METHOD OF BEAMFORMING

CROSS REFERENCE

This application claims the benefit of and priority from U.S. Provisional Patent Application No. 62/068,032 entitled "Apparatus, Method and System of Beamforming", filed Oct. 24, 2014, the entire disclosure of which is incorporated herein by reference.

TECHNICAL FIELD

Embodiments described herein generally relate to beamforming.

BACKGROUND

A wireless communication network in a millimeter-wave band may provide high-speed data access for users of wireless communication devices.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
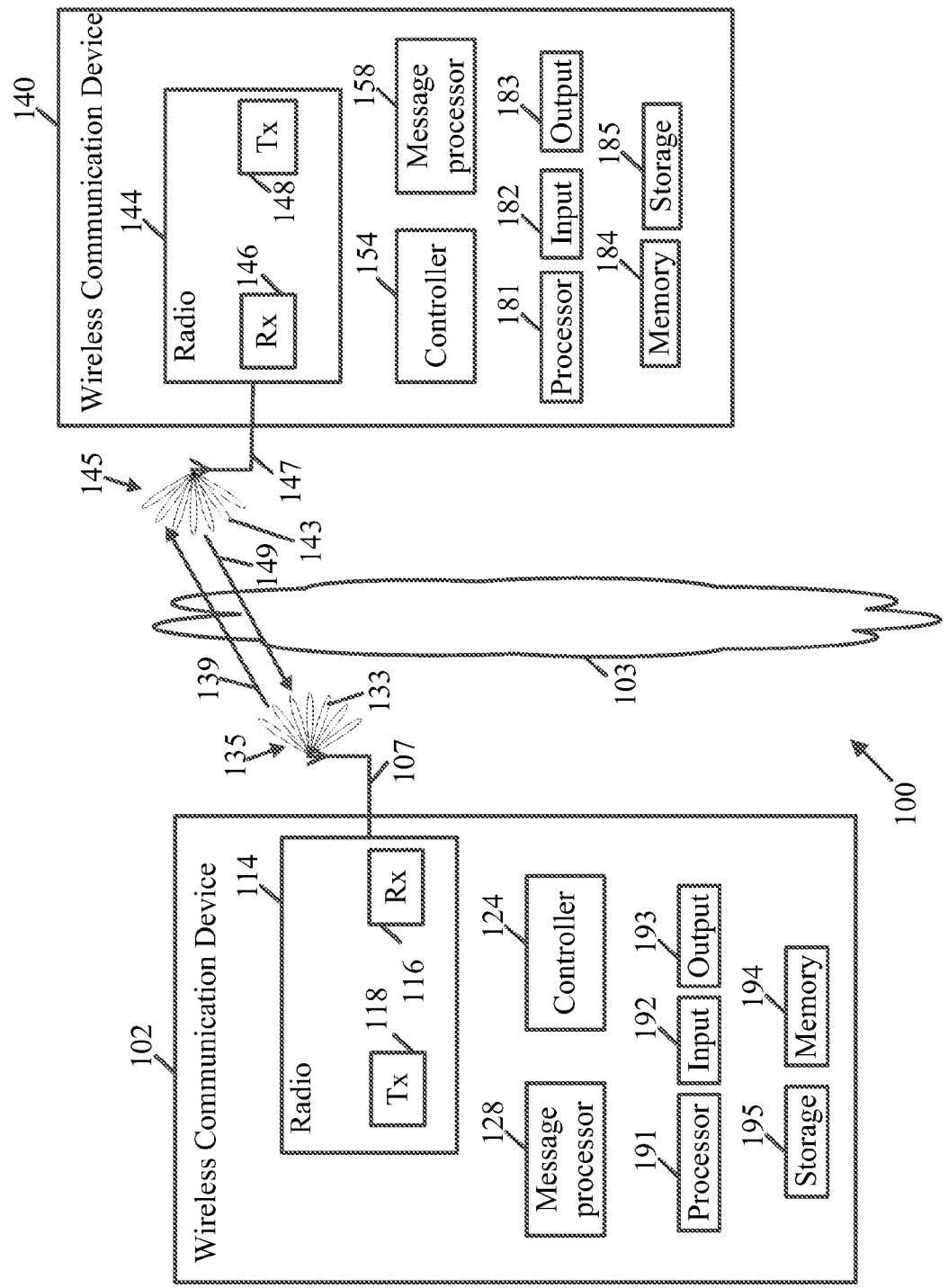
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High*

Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network, and/or any other network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include and/or perform the functionality of one or more STAs. For example, device 102 may include at least one STA, and/or device 140 may include at least one STA.

In some demonstrative embodiments, devices 102 and/or 140 may include and/or perform the functionality of one or more DMG STAs. For example, device 102 may include at least one DMG STA, and/or device 140 may include at least one DMG STA.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, devices 102 and/or 140 may perform the functionality of any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, an Internet of Things (IoT) device, a sensor device, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments WM 103 may include any other directional channel.

In other embodiments, WM 103 may include any other additional or alternative type of channel over any other frequency band.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145.

In some demonstrative embodiments, devices 102 and/or 140 may select a pair of beams including a first beam direction of the plurality of beam directions 135, e.g., including a direction 133, and a second beam direction of the plurality of beam directions 145, e.g., including a direction 143, to communicate between devices 102 and 140, for example, via a mmWave wireless communication link and/or any other link.

In some demonstrative embodiments, device 102 may include a controller 124, and/or device 140 may include a controller 154. Controllers 124 and/or 154 may be configured to perform one or more functionalities, communications, operations and/or procedures, for example, including one or more beamforming functionalities, communications, operations and/or procedures between devices 102 and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, system 100 may include a beamforming initiator (BI) and a beamforming responder (BR) to perform beamforming between the BI and the BR. For example, wireless communication device 102 may perform the functionality of the BI, and/or wireless communication device 140 may perform the functionality of the BR.

In other embodiments, wireless communication device 140 may perform the functionality of the BI, and/or wireless communication device 102 may perform the functionality of the BR.

In some demonstrative embodiments, devices 102 and/or 140 may perform a Beamforming procedure (also refereed to as "beamforming training protocol") including a Sector level sweep (SLS) phase, e.g., including, for example, an Initiator Sector Sweep (ISS), which may include, for example, a sector sweep performed, for example, by the Beamforming initiator; and/or a responder sector sweep (RSS), which may include, for example, a sector sweep performed, for example, by the Beamforming responder. The RSS may, for example, follow the ISS.

In some demonstrative embodiments, devices 102 and/or 140 may opt to perform a Beam Refinement Phase (BRP), e.g., following the SLS phase.

Some demonstrative embodiments are described herein with respect to a BRP, which may be performed after a SLS phase of a beamforming procedure. However, in other embodiments, a BRP may be performed as part of any other phase and/or procedure.

In some demonstrative embodiments, devices 102 and/or 140 may exchange a plurality of BRP frames during the BRP. For example, device 102 may send one or more, e.g., a plurality of, BRP frames 139 to device 140, and/or device 140 may send one or more, e.g., a plurality of, BRP frames 149 to device 102.

In some demonstrative embodiments, one of devices 102 and/or 140 may perform the functionality of a BRP initiator, e.g., to initiate the exchange of BRP frames 139 and 149; and/or another one of devices 102 and/or 140 may perform the functionality of a BRP responder.

In one example, device 102 may perform the functionality of the BRP initiator and/or device 140 may perform the functionality of the BRP responder. In another example, device 140 may perform the functionality of the BRP initiator and/or device 102 may perform the functionality of the BRP responder.

In some demonstrative embodiments, a BRP frame of BRP frames 139 and/or 149, e.g., each BRP frame except a first BRP frame, may be both a request for training and a response for training.

In some demonstrative embodiments, devices 102 and/or 140 may continue the training process, for example, by continuing to perform the BRP, e.g., until at least one of devices 102 and 140, e.g., both devices 102 and 140, do not require further beamforming training.

In some demonstrative embodiments, the BRP initiator may not be able to know in advance how long the training process may actually last, for example, since a number of BRP repetitions may depend on a result of each BRP sequence.

In some demonstrative embodiments, potential interference between another station and BRP packets 139 and/or 149 may occur, for example, if a time period of the BRP is not protected and/or reserved, e.g., to avoid and/or prohibit potentially interfering transmissions from one or more other devices.

In some demonstrative embodiments, protection of the time period of the BRP may be achieved, for example, by setting a duration field in BRP frames 139 and/or 149, for example, to cover at least a duration of the BRP, e.g., as described below.

In some demonstrative embodiments, device 102 may set a duration field in BRP frames 139, and/or device 140 may set a duration field in BRP frames 149, for example, to indicate to one or more other stations that WM 103 is to be occupied and/or reserved by devices 102 and 140, and/or to indicate that at least some other communications over WM 103 are to be avoided or prohibited, e.g., as described below.

In some demonstrative embodiments, another station (not shown in FIG. 1) may set a Network Allocation Vector (NAV) to a duration based on the duration indicated by the BRP frames 139 and/or 149 during the BRP.

In some demonstrative embodiments, the BRP initiator, e.g., device 102, may set the duration field in BRP frames transmitted by the BRP initiator to a value, which may cover at least a duration of the BRP.

In some demonstrative embodiments, the BRP initiator, e.g., device 102, may set the duration field in BRP frames transmitted by the BRP initiator to a value representing a duration, which may be longer than a maximal expected duration of the BRP sequence, e.g., as described below.

In one example, controller 124 may set a duration field of a BRP frame 139 to a duration value, which may be determined, for example, based on an expected maximal remaining time until the end of the BRP.

In some demonstrative embodiments, controller 124 may be configured to free the WM 103, for example, if the BRP is to end prior to the expected maximal duration of the BRP, e.g., if both devices 102 and 140 have completed the beamforming training process.

In some demonstrative embodiments, controller 124 may be configured to cause device 102 to transmit one or more frames to indicate that the WM 103 is to be freed, e.g., as described below.

For example, controller 124 may be configured to cause device 102 to transmit one or more Contention Free End (CF-End) frames configured to indicate to another station to truncate the NAV, which was previously asserted by the other station, e.g., based on the duration field in the BRP frames 139.

Some demonstrative embodiments are described herein with respect to communicating one or more CF-End frames to indicate an end and/or a truncation of a contention free period or a reserved period. However, in other embodiments, any other type of transmission, message, packet, and/or frame may be communicated to indicate an end and/or a truncation of a reserved period, a contention free period, or any other period, which may be covered by the duration indicated by the BRP frames.

In some demonstrative embodiments, controller 124 may cause device 102 to transmit a single CF-End frame, e.g., as described below.

In some demonstrative embodiments, controller 124 may cause device 102 to transmit a plurality of CF-End frames, e.g., a sequence of CF-End frames, as described below.

In one example, controller 124 may cause device 102 to transmit a sequence of CF-End frames corresponding to respective ones of previously transmitted BRP frames 139.

For example, each CF-End frame may be transmitted in a direction in which a respective BRP frame 139 was transmitted.

In some demonstrative embodiments, the transmission of the sequence of CF-end frames may enable, for example, to increase the probability that a station which has previously received a BRP frame 139 in a particular direction, may receive a CF-End frame, e.g., to truncate the NAV asserted based on the BRP frame 139.

In some demonstrative embodiments, the BRP responder, e.g., device 140, may transmit one or more CF-End frames, e.g., in response to the CF-End frame from the BRP initiator.

For example, controller 154 may cause device 140 to transmit a CF-End frame, for example, in response to a CF-End frame, e.g., each CF-End frame or only some of the CF-End frames, received from device 102.

In some demonstrative embodiments, the BRP initiator, e.g., device 102, may set a duration field of a duration value of a CF-End frame sent by the BRP initiator to a value configured to cover a duration of transmission of any remaining CF-End frames to be transmitted by the BRP initiator and the one or more CF-End frames to be transmitted in response by the BRP responder, e.g., as described below.

In some demonstrative embodiments, controller 124 may be configured to cause a wireless station ("STA A"), e.g., a STA implemented by device 102, to process transmission of a first plurality of BRP frames, e.g. BRP frames 139, to a wireless station ("STA B"), e.g., a wireless station implemented by device 140, during a BRP.

In some demonstrative embodiments, the STA A may be a BRP initiator, and/or the STA B may be a BRP responder.

In some demonstrative embodiments, the STA A and/or the STA B may include a DMG STA, or any other STA.

In some demonstrative embodiments, controller 124 may be configured to cause the STA A to set one or more duration fields of one or more respective BRP frames of the first plurality of BRP frames, e.g., BRP frames 139, according to an end time, e.g., as described below.

In some demonstrative embodiments, controller 124 may be configured to cause the STA A to set a duration field of each BRP frame of the first plurality of BRP frames, e.g., each of BRP frames 139, according to the end time.

In other embodiments, controller 124 may be configured to cause the STA A to set a duration field of only some BRP frames of the first plurality of BRP frames according to the end time.

In some demonstrative embodiments, the BRP may be within a Transmit Opportunity (TxOP). According to these embodiments, controller 124 may determine the end time to be, for example, before an end of the TxOP.

In some demonstrative embodiments, controller 124 may determine the end time to be, for example, a time at or after an end of the BRP.

In some demonstrative embodiments, controller 124 may determine the end time to be, for example, a time at or after a maximal expected duration of the BRP.

In some demonstrative embodiments, controller 124 may determine the end time to be any other time.

In some demonstrative embodiments, controller 154 may be configured to cause the STA B to process reception of the first plurality of BRP frames, e.g., BRP frames 139, from the STA A.

In some demonstrative embodiments, controller 154 may be configured to cause the STA B to process transmission of a second plurality of BRP frames, e.g., BRP frames 149, to the STA A during the BRP.

In some demonstrative embodiments, controller 154 may be configured to cause the STA B to set one or more duration fields of one or more respective BRP frames of the second plurality of BRP frames, e.g., BRP frames 149, according to the end time, e.g., the same end time used to set the duration field of the first plurality of BRP frames.

In some demonstrative embodiments, controller 154 may be configured to cause the STA B to set a duration field of each BRP frame of the second plurality of BRP frames, e.g., each of BRP frames 149, according to the end time.

In other embodiments, controller 154 may be configured to cause the STA B to set a duration field of only some BRP frames of the second plurality of BRP frames according to the end time.

In some demonstrative embodiments, controller 154 may be configured to cause the STA B to set a duration filed of at least one BRP frame of the second plurality of BRP frames according to a time different from the end time.

In some demonstrative embodiments, controller 154 may be configured to cause the STA B to set a duration filed of a last BRP frame of the second plurality of BRP frames, e.g., a last frame of BRP frames 149, according to a time before the end time, e.g., as described below.

In some demonstrative embodiments, controller 124 may be configured to cause the STA A to process reception of the second plurality of BRP frames, e.g., BRP frames 149, from the STA B.

In some demonstrative embodiments, controller 124 may be configured to cause the STA A to process transmission of at least one CF-End frame, for example, upon an end of the BRP, e.g., at the end of the BRP or after the end of the BRP.

In some demonstrative embodiments, the at least one CF-End frame may be configured to indicate, e.g., to one or more other stations, that the duration indicated by the first plurality of BRP frames is to be truncated, for example, to enable freeing the WM 103.

In some demonstrative embodiments, controller 124 may be configured to cause the STA A to process transmission of a single CF-End frame, e.g., as described below.

In some demonstrative embodiments, controller 124 may be configured to cause the STA A to process transmission of a plurality of CF-End frames, e.g., as described below.

In some demonstrative embodiments, controller 124 may be configured to determine a number of CF-End frames in the plurality of CF-End frames, for example, based on a number of the first plurality of BRP frames, e.g., a number of BRP frames 139 transmitted by the STA A.

In some demonstrative embodiments, controller 124 may be configured to determine the number of CF-End frames in the plurality of CF-End frames to be equal to or less than the number of the first plurality of BRP frames.

In some demonstrative embodiments, controller 124 may be configured to determine the number of CF-End frames in the plurality of CF-End frames, for example, based on a number of different directions of transmission of the first plurality of BRP frames, e.g., a number of different directions used to transit the BRP frames 139 from the STA A.

In some demonstrative embodiments, controller 124 may be configured to cause the STA A to send the plurality of CF-End frames in one or more directions, in which the BRP frames 139 have been transmitted.

In some demonstrative embodiments, controller 124 may be configured to cause the STA A to process transmission of a first CF-End frame in a first direction of transmission of a first BRP frame of the first plurality of BRP frames, and a second CF-End frame in a second direction of transmission of a second BRP frame of the first plurality of BRP frames.

In some demonstrative embodiments, controller 124 may be configured to determine the number of CF-End frames in the plurality of CF-End frames to be equal to or greater than the number of different directions of transmission of the first plurality of BRP frames.

For example, controller 124 may determine to send a CF-End frame for each different direction in which one or more BRP frames 139 have been transmitted.

In other demonstrative embodiments, controller 124 may be configured to determine the number of CF-End frames in the plurality of CF-End frames to be less than the number of different directions of transmission of the first plurality of BRP frames.

For example, controller 124 may determine to send CF-End frames for only some of the different directions in which BRP frames 139 have been transmitted.

In one example, controller 124 may cause the STA A to send a first CF-End frame in a first direction of a first BRP frame 139 of the plurality of BRP frames 139, and to send a second CF-End frame in a second direction of a last BRP frame 139 of the plurality of BRP frames 139, e.g., as described below.

In some demonstrative embodiments, controller 124 may be configured to cause the STA A to set a duration field in a CF-End frame to cover a duration, which is based on a number of CF-End frames in the plurality of CF-End frames.

In some demonstrative embodiments, controller 124 may set the duration value in a CF-End frame, e.g., each CF-End frame or only some of the CF-End frames to be transmitted by device 102, to a value, denoted DURATION, e.g., as follows:

$$\text{DURATION=Remainder\_of\_CF-End\_frames} \times 2 \times \text{CF-End\_length} + + (\text{Remainder\_of\_CF-End\_frames} \times 2-1) \times \text{SIFS} \quad (1)$$

wherein Remainder_of_CF-End_frames denotes a number of remaining CF-End frames to be transmitted by the BRP initiator, wherein CF-End_length denotes a length of a CF-End frame, and wherein SIFS is a Short Inter Frame Space.

In other embodiments, controller 124 may determine the duration value of the CF-End frame according to any other criteria and/or parameters.

In some demonstrative embodiments, controller 154 may be configured to cause the STA to process transmission of at least one CF-End frame, for example, upon an end of the BRP, e.g., at the end of the BRP or after the end of the BRP.

In some demonstrative embodiments, the at least one CF-End frame may be configured to indicate, e.g., to one or more other stations, that the duration indicated by the second plurality of BRP frames is to be truncated, for example, to enable freeing the WM 103.

In some demonstrative embodiments, controller 154 may be configured to cause the STA B to process transmission of a single CF-End frame, e.g., as described below.

In some demonstrative embodiments, controller 154 may be configured to cause the STA B to process transmission of a plurality of CF-End frames, e.g., as described below.

In some demonstrative embodiments, controller 154 may be configured to determine a number of CF-End frames in the plurality of CF-End frames, for example, based on a number of the second plurality of BRP frames, e.g., a number of BRP frames 149 transmitted by the STA B.

In some demonstrative embodiments, controller 154 may be configured to determine the number of CF-End frames in the plurality of CF-End frames to be equal to or less than the number of the second plurality of BRP frames.

In some demonstrative embodiments, controller 154 may be configured to determine the number of CF-End frames in the plurality of CF-End frames, for example, based on a number of different directions of transmission of the second plurality of BRP frames, e.g., a number of different directions used to transit the BRP frames 149 from the STA B.

In some demonstrative embodiments, controller 154 may be configured to cause the STA B to send the plurality of CF-End frames in one or more directions, in which the BRP frames 149 have been transmitted.

In some demonstrative embodiments, controller 154 may be configured to cause the STA B to process transmission of a first CF-End frame in a first direction of transmission of a first BRP frame of the second plurality of BRP frames, and a second CF-End frame in a second direction of transmission of a second BRP frame of the second plurality of BRP frames.

In some demonstrative embodiments, controller 154 may be configured to determine the number of CF-End frames in the plurality of CF-End frames to be equal to or greater than the number of different directions of transmission of the second plurality of BRP frames.

For example, controller 154 may determine to send a CF-End frame for each different direction in which one or more BRP frames 149 have been transmitted.

In other demonstrative embodiments, controller 149 may be configured to determine the number of CF-End frames in the plurality of CF-End frames to be less than the number of different directions of transmission of the second plurality of BRP frames.

For example, controller 154 may determine to send CF-End frames for only some of the different directions in which BRP frames 149 have been transmitted.

In one example, controller 154 may cause the STA B to send a first CF-End frame in a first direction of a first BRP frame 149 of the plurality of BRP frames 149, and to send a second CF-End frame in a second direction of a last BRP frame 149 of the plurality of BRP frames 149, e.g., as described below.

In some demonstrative embodiments, controller 154 may be configured to cause the STA B to set a duration field in a CF-End frame to cover a duration, which is based on a number of CF-End frames in the plurality of CF-End frames.

In some demonstrative embodiments, controller 154 may set the duration value in a CF-End frame, e.g., each CF-End frame or only some of the CF-End frames to be transmitted by device 140, to the value DURATION, e.g., according to Equation 1.

In other embodiments, controller 154 may determine the duration value of the CF-End frame according to any other criteria and/or parameters.

Figure 2:
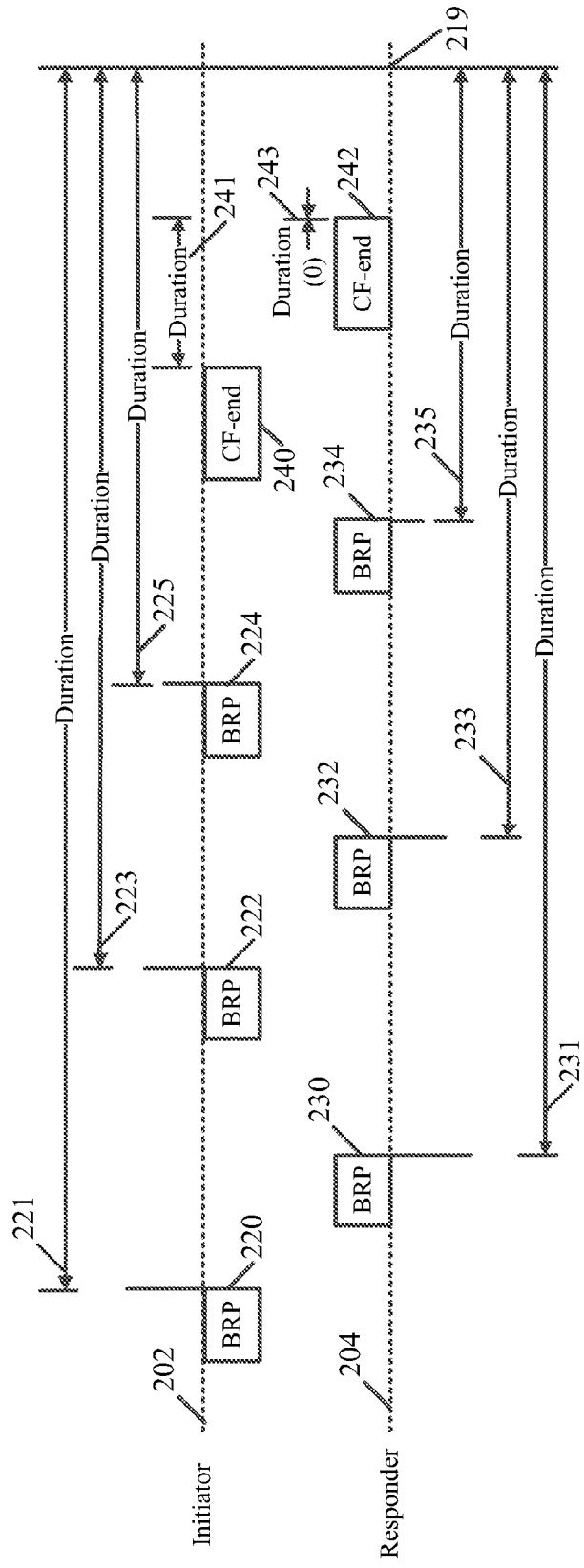
FIG. 2 is a schematic illustration of communications of a Beam Refinement Phase (BRP) between an initiator and a responder, in accordance with some demonstrative embodiments.

Reference is made to FIG. 2, which schematically illustrates communications of a BRP between a BRP initiator 202 and a BRP responder 204, in accordance with some demonstrative embodiments. For example, device 102 (FIG. 1) may perform the functionality of the initiator 202, and/or device 140 (FIG. 1) may perform the functionality of the responder 204.

In some demonstrative embodiments, as shown in FIG. 2, the BRP initiator 202 may set the duration field for each packet transmitted by the BRP initiator 202 in the BRP exchange according to an end time 219, e.g., a maximal expected BRP time.

For example, as shown in FIG. 2, the duration value of a BRP frame, e.g., each BRP frame, transmitted by the BRP initiator 202 may be set to cover a remaining duration until the end time 219.

In one example, as shown in FIG. 2, BRP initiator 202 may set a duration field of a BRP frame 220 to cover a duration 221 until end time 219; BRP initiator 202 may set a duration field of a BRP frame 222 to cover a duration 223 until end time 219, e.g., duration 223 may be shorter than duration 221; and/or BRP initiator 202 may set a duration field of a BRP frame 224 to cover a duration 225 until end time 219, e.g., duration 225 may be shorter than duration 223.

In some demonstrative embodiments, the BRP responder 204 may set the duration field for one or more BRP frames, e.g., each packet, transmitted by the BRP responder 204 in the BRP exchange, e.g., as shown in FIG. 2.

For example, as shown in FIG. 2, the duration value of one or more BRP frames, e.g., each BRP frame, transmitted by the BRP responder 204 may be set to cover a remaining duration until the end time 219.

In one example, as shown in FIG. 2, BRP responder 204 may set a duration field of a BRP frame 230 to cover a duration 231 until end time 219; BRP responder 204 may set a duration field of a BRP frame 232 to cover a duration 233 until end time 219, e.g., duration 233 may be shorter than duration 231; and/or BRP responder 204 may set a duration field of a BRP frame 234 to cover a duration 235 until end time 219, e.g., duration 235 may be shorter than duration 233.

In some demonstrative embodiments, the BRP initiator 202 may send a CF-end frame 204 upon an end of the BRP sequence, for example, at an actual end of the BRP sequence or after the end of the BRP sequence, e.g., to enable truncating a protected duration set by the BRP frames 220, 222, and/or 224.

In some demonstrative embodiments, as shown in FIG. 2, the BRP initiator 202 may send a single CF-End frame 240 at the end of the BRP session.

In some demonstrative embodiments, as shown in FIG. 2, the BRP initiator 202 may set a duration field of the CF-End frame 240 to a duration covering a period 241.

In some demonstrative embodiments, the period 241 may include a period of a CF-end frame and a SIFS, e.g., CF-End_length+SIFS.

In some demonstrative embodiments, the BRP responder 204 may transmit a CF-end frame 242 with a duration 243, e.g., of zero, for example, in response to receiving the CF-End frame 240 from the BRP initiator 202.

In some demonstrative embodiments, transmitting the CF-End frame 240 by the BRP initiator 202 and/or the CF-End frame 242 by the BRP responder 204 may enable shortening and/or truncating the NAV set by other stations, e.g., based on the duration fields of the BRP frames 220, 222, 224, 230, 232, and/or 234. As a result, the other device receiving CF-End frame 240 and/or CF-end Frame 242 may be allowed contend for the wireless media at a time e.g., following the reception of the CF-End frames 202 and/or 242, for example, instead of having to wait until end time 219.

In some demonstrative embodiments, the BRP initiator 202 may send the CF-end frame 240 using a direction ("best transmit direction") of the BRP initiator 202, which may be determined by the BRP initiator 202, e.g., at the end of the BRP.

In some demonstrative embodiments, the BRP responder 204 may send the CF-end frame 242 using a direction ("best transmit direction") of the BRP responder, which may be determined by the BRP responder 204, e.g., at the end of the BRP.

In some demonstrative embodiments, the BRP initiator 202 may transmit the CF-End frame 240 in a control PHY, and/or the BRP responder 204 may transmit the CF-End frame 242 in a control PHY.

In some demonstrative embodiments, the communication scheme of FIG. 2, e.g., including a single CF-End frame 240 from the BRP initiator 202, and/or a single CF-End frame 242 from the BRP responder 204, may be implemented, for example, to enable efficient truncation of the protected BRP duration, e.g., before ht end time 219, for example, at least in situations when the direction of transmission does not change significantly during the BRP training process.

Figure 3:
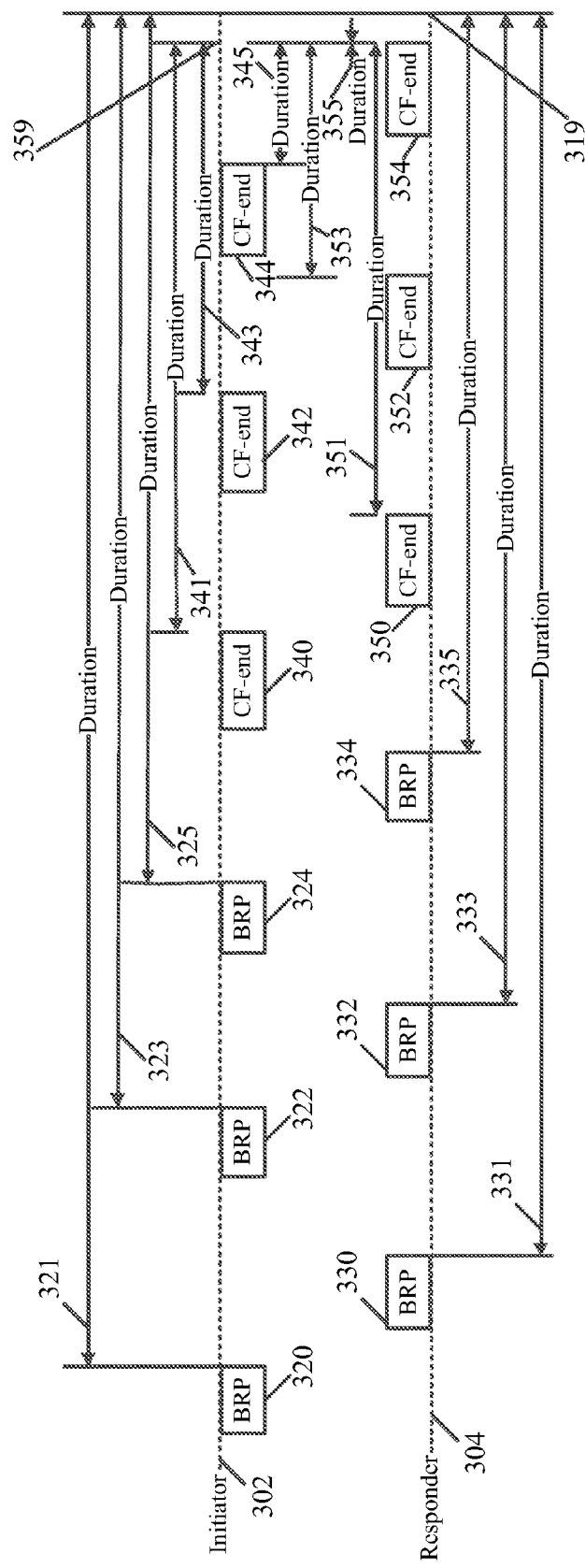
FIG. 3 is a schematic illustration of communications of a BRP between an initiator and a responder, in accordance with some demonstrative embodiments.

Reference is made to FIG. 3, which schematically illustrates communications of a BRP between a BRP initiator 302 and a BRP responder 304, in accordance with some demonstrative embodiments. For example, device 102 (FIG. 1) may perform the functionality of the initiator 302, and/or device 140 (FIG. 1) may perform the functionality of the responder 304.

In some demonstrative embodiments, as shown in FIG. 3, the BRP initiator 302 may set the duration field for each packet transmitted by the BRP initiator 302 in the BRP exchange according to an end time 319, e.g., a maximal expected BRP time.

For example, as shown in FIG. 3, the duration value of a BRP frame, e.g., each BRP frame, transmitted by the BRP initiator 302 may be set to cover a remaining duration until the end time 319.

In one example, as shown in FIG. 3, BRP initiator 302 may set a duration field of a BRP frame 320 to cover a duration 321 until end time 319; BRP initiator 302 may set a duration field of a BRP frame 322 to cover a duration 323 until end time 319, e.g., duration 323 may be shorter than duration 321; and/or BRP initiator 302 may set a duration field of a BRP frame 324 to cover a duration 325 until end time 319, e.g., duration 325 may be shorter than duration 323.

In some demonstrative embodiments, the BRP responder 304 may set the duration field for one or more BRP frames, e.g., each packet, transmitted by the BRP responder 304 in the BRP exchange, e.g., as shown in FIG. 3.

For example, as shown in FIG. 3, the duration value of one or more BRP frames, e.g., each BRP frame, transmitted by the BRP responder 304 may be set to cover a remaining duration until the end time 319.

In one example, as shown in FIG. 3, BRP responder 304 may set a duration field of a BRP frame 330 to cover a duration 331 until end time 319; BRP responder 304 may set a duration field of a BRP frame 332 to cover a duration 333 until end time 319, e.g., duration 333 may be shorter than duration 331; and/or BRP responder 304 may set a duration field of a BRP frame 334 to cover a duration 335 until end time 319, e.g., duration 335 may be shorter than duration 333.

In some demonstrative embodiments, as shown in FIG. 3, the BRP initiator 302 may send a plurality of CF-End frames upon the end of the BRP, e.g., at the end of the BRP or after the end of the BRP; and/or the BRP responder 304 may send a plurality of CF-End frames upon the end of the BRP, e.g., at the end of the BRP or after the end of the BRP.

In some demonstrative embodiments, the CF-End frames sent be the BRP initiator 302 may enable truncating a protected duration set by the BRP frames 320, 322, and/or 324; and/or the CF-End frames sent be the BRP responder 304 may enable truncating the protected duration set by the BRP frames 330, 332, and/or 334.

In some demonstrative embodiments, the number of CF-end frames sent by the BRP initiator 302 may be equal to the number of BRP frames transmitted by the BRP initiator 302; and/or the number of CF-end frame sent by the BRP responder 304 may be equal to the number of BRP frames transmitted by the BRP responder 304.

In some demonstrative embodiments, the BRP initiator 302 may be configured to transmit a CF-End frame, for example, for every BRP frame transmitted by the BRP initiator 302 during the BRP process; and/or the BRP responder 304 may be configured to transmit a CF-End frame, for example, for every BRP frame transmitted by the BRP responder 304 during the BRP process.

For example, as shown in FIG. 3, the BRP initiator 302 may transmit three CF-End frames, e.g., a CF-End frame 340, a CF-End frame 342 and/or a CF-End frame 344, for example, corresponding to the three CF-End Frames 320, 322 and 324 transmitted by the BRP initiator 302.

For example, as shown in FIG. 3, the BRP responder 304 may transmit three CF-End frames, e.g., a CF-End frame 350, a CF-End frame 352 and/or a CF-End frame 354, for example, corresponding to the three CF-End Frames 330, 332 and 334 transmitted by the BRP responder 304.

In some demonstrative embodiments, a CF-End frame may be transmitted in the direction in which a corresponding BRP frame was transmitted.

For example, the BRP initiator 302 may transmit the CF-End frames 340, 342, and/or 344 in directions corresponding to respective directions of the BRP packets 320, 322, and/or 324 transmitted by the BRP initiator 302.

For example, the BRP responder 304 may transmit the CF-End frames 350, 352, and/or 354 in directions corresponding to respective directions of the BRP packets 330, 332, and/or 334 transmitted by the BRP responder 304.

In some demonstrative embodiments, transmitting a CF-End frame in a transmission direction of a previously transmitted BRP frame may increase the probability that a device, e.g., every device, which previously received a duration from a BRP frame during the BRP process, will be able to receive the corresponding CF-End frame to indicate the shortening of the NAV, e.g., if the device remains in a Receive (RX) mode.

In some demonstrative embodiments, as shown in FIG. 3, the BRP initiator 302 may set a duration field of the CF-End frames 340, 342 and/or 344 to a duration covering a period, which is to end before end point 319.

In some demonstrative embodiments, the BRP initiator 302 may set a duration field of the CF-End frames 340, 342 and/or 344 to cover a duration, which is based on a number of CF-End frames in the plurality of CF-End frames transmitted by BRP initiator 302.

In one example, as shown in FIG. 3, BRP initiator 302 may set a duration field of a CF-End frame 340 to cover a duration 341 until a time 359; BRP initiator 302 may set a duration field of a CF-End frame 342 to cover a duration 343 until time 359, e.g., duration 343 may be shorter than duration 341; and/or BRP initiator 302 may set a duration field of a CF-End frame 344 to cover a duration 345 until time 359, e.g., duration 345 may be shorter than duration 343.

In some demonstrative embodiments, BRP initiator 302 may determine the time periods 343, 345, and/or 345, for example, in accordance with Equation 1.

In some demonstrative embodiments, as shown in FIG. 3, the BRP responder 304 may set a duration field of the CF-End frames 350, 352 and/or 354 to a duration covering a period, which is to end before end point 319.

In some demonstrative embodiments, the BRP responder 304 may set a duration field of the CF-End frames 350, 352 and/or 354 to cover a duration, which is based on a number of CF-End frames in the plurality of CF-End frames transmitted by BRP responder 304.

In one example, as shown in FIG. 3, BRP responder 304 may set a duration field of a CF-End frame 350 to cover a duration 351 until time 359; BRP responder 304 may set a duration field of a CF-End frame 352 to cover a duration 353 until time 359, e.g., duration 353 may be shorter than duration 351; and/or BRP responder 304 may set a duration field of a CF-End frame 354 to cover a duration 355 until time 359, e.g., duration 355 may be shorter than duration 353.

In some demonstrative embodiments, BRP responder 304 may determine the time periods 351, 353, and/or 355, for example, in accordance with Equation 1.

In some demonstrative embodiments, the BRP responder 304 may transmit the CF-end frame 354 with the duration 355, e.g., of zero.

In some demonstrative embodiments, transmitting the CF-End frames 340, 342, and/or 344 by the BRP initiator 302 and/or the CF-End frames 350, 352, and/or 354 by the BRP responder 304 may enable shortening and/or truncating the NAV set by other stations, e.g., based on the duration fields of the BRP frames 320, 322, 324, 330, 332, and/or 334. As a result, the an other device receiving CF-End frame 340, 342, 344, 350, 352, and/or 354 may be allowed contend for the wireless media, e.g., following the reception of the CF-End frames 340, 342, 344, 350, 352, and/or 354, e.g., at time 359, for example, instead of having to wait until end time 319.

Figure 4:
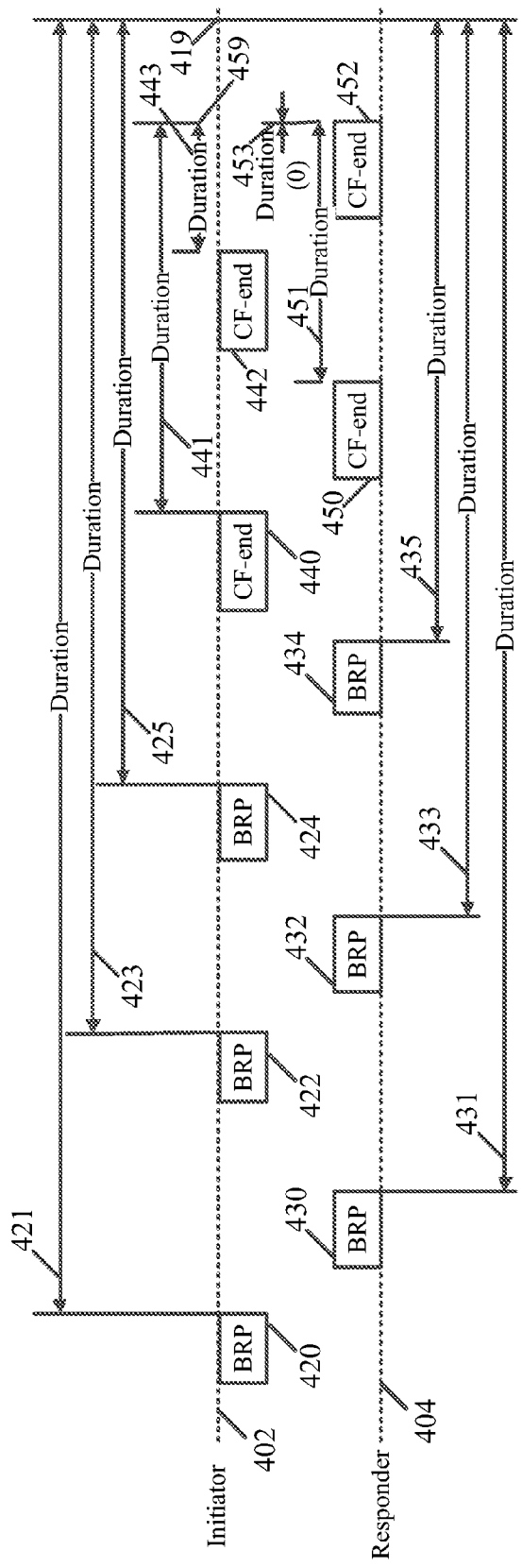
FIG. 4 is a schematic illustration of communications of a BRP between an initiator and a responder, in accordance with some demonstrative embodiments.

Reference is made to FIG. 4, which schematically illustrates communications of a BRP between a BRP initiator 402 and a BRP responder 404, in accordance with some demonstrative embodiments. For example, device 102 (FIG. 1) may perform the functionality of the initiator 402, and/or device 140 (FIG. 1) may perform the functionality of the responder 404.

In some demonstrative embodiments, as shown in FIG. 4, the BRP initiator 402 may set the duration field for each packet transmitted by the BRP initiator 402 in the BRP exchange according to an end time 419, e.g., a maximal expected BRP time.

For example, as shown in FIG. 4, the duration value of a BRP frame, e.g., each BRP frame, transmitted by the BRP initiator 402 may be set to cover a remaining duration until the end time 419.

In one example, as shown in FIG. 4, BRP initiator 402 may set a duration field of a BRP frame 420 to cover a duration 421 until end time 419; BRP initiator 402 may set a duration field of a BRP frame 422 to cover a duration 423 until end time 419, e.g., duration 423 may be shorter than duration 421; and/or BRP initiator 402 may set a duration field of a BRP frame 424 to cover a duration 425 until end time 419, e.g., duration 425 may be shorter than duration 423.

In some demonstrative embodiments, the BRP responder 404 may set the duration field for one or more BRP frames, e.g., each packet, transmitted by the BRP responder 404 in the BRP exchange, e.g., as shown in FIG. 4.

For example, as shown in FIG. 4, the duration value of one or more BRP frames, e.g., each BRP frame, transmitted by the BRP responder 404 may be set to cover a remaining duration until the end time 419.

In one example, as shown in FIG. 4, BRP responder 404 may set a duration field of a BRP frame 430 to cover a duration 431 until end time 419; BRP responder 404 may set a duration field of a BRP frame 432 to cover a duration 433 until end time 419, e.g., duration 433 may be shorter than duration 431; and/or BRP responder 404 may set a duration field of a BRP frame 434 to cover a duration 435 until end time 419, e.g., duration 435 may be shorter than duration 433.

In some demonstrative embodiments, as shown in FIG. 4, the BRP initiator 402 may send a plurality of CF-End frames upon the end of the BRP, e.g., at the end of the BRP or after the end of the BRP; and/or the BRP responder 404 may send a plurality of CF-End frames upon the end of the BRP, e.g., at the end of the BRP or after the end of the BRP.

In some demonstrative embodiments, the CF-End frames sent be the BRP initiator 402 may enable truncating a protected duration set by the BRP frames 420, 422, and/or 424; and/or the CF-End frames sent be the BRP responder 404 may enable truncating the protected duration set by the BRP frames 430, 432, and/or 434.

In some demonstrative embodiments, the number of CF-end frames sent by the BRP initiator 402 may be less that the number of BRP frames transmitted by the BRP initiator 402; and/or the number of CF-end frame sent by the BRP responder 404 may be less than the number of BRP frames transmitted by the BRP responder 404.

In one example, e.g., as shown in FIG. 4, the BRP initiator 402 may transmit two CF-End frames, and/or the BRP responder 404 may transmit two CF-End frames, e.g., as described below. In other embodiments, the BRP initiator

402 may transmit any other number of CF-End frames, and/or the BRP responder 404 may transmit any other number of CF-End frames.

For example, as shown in FIG. 4, the BRP initiator 402 may transmit two CF-End frames, e.g., a CF-End frame 440, and/or a CF-End frame 442; and/or the BRP responder 404 may transmit two CF-End frames, e.g., a CF-End frame 450, and/or a CF-End frame 452.

In some demonstrative embodiments, a CF-End frame may be transmitted in the direction in which a corresponding BRP frame was transmitted.

In some demonstrative embodiments, the BRP initiator 402 may transmit a first CF-End frame, e.g., the CF-End frame 440, in the direction of a first BRP frame transmitted by the BRP initiator 402, e.g., a direction of BRP frame 420; and/or a second CF-End frame, e.g., CF-End frame 442, in the direction of a last BRP frame transmitted by the BRP initiator 402, e.g., a direction of the BRP frame 424.

In some demonstrative embodiments, the BRP responder 404 may transmit a first CF-End frame, e.g., the CF-End frame 450, in the direction of a first BRP frame transmitted by the BRP responder 404, e.g., a direction of BRP frame 430; and/or a second CF-End frame, e.g., CF-End frame 452, in the direction of a last BRP frame transmitted by the BRP responder 404, e.g., a direction of the BRP frame 434.

In some demonstrative embodiments, as shown in FIG. 4, the BRP initiator 402 may set a duration field of the CF-End frames 440 and/or 442 to a duration covering a period, which is to end before end point 419.

In some demonstrative embodiments, the BRP initiator 402 may set a duration field of the CF-End frames 440 and/or 442 to cover a duration, which is based on a number of CF-End frames in the plurality of CF-End frames transmitted by BRP initiator 402.

In one example, as shown in FIG. 4, BRP initiator 402 may set a duration field of a CF-End frame 440 to cover a duration 441 until a time 459; and/or BRP initiator 402 may set a duration field of a CF-End frame 442 to cover a duration 443 until time 459, e.g., duration 443 may be shorter than duration 441.

In some demonstrative embodiments, BRP initiator 402 may determine the time periods 441 and/or 443, for example, in accordance with Equation 1.

In some demonstrative embodiments, as shown in FIG. 4, the BRP responder 404 may set a duration field of the CF-End frames 450 and/or 452 to a duration covering a period, which is to end before end point 419.

In some demonstrative embodiments, the BRP responder 404 may set a duration field of the CF-End frames 450 and/or 452 to cover a duration, which is based on a number of CF-End frames in the plurality of CF-End frames transmitted by BRP responder 404.

In one example, as shown in FIG. 4, BRP responder 404 may set a duration field of a CF-End frame 450 to cover a duration 451 until time 459; and/or BRP responder 404 may set a duration field of a CF-End frame 452 to cover a duration 453 until time 459.

In some demonstrative embodiments, BRP responder 404 may determine the time periods 451, and/or 453, for example, in accordance with Equation 1.

In some demonstrative embodiments, the BRP responder 404 may transmit the CF-end frame 452 with the duration 453, e.g., of zero.

In some demonstrative embodiments, transmitting the CF-End frames 440, and/or 442 by the BRP initiator 402 and/or the CF-End frames 450 and/or 452 by the BRP responder 404 may enable shortening and/or truncating the NAV set by other stations, e.g., based on the duration fields of the BRP frames 420, 422, 424, 430, 432, and/or 434. As a result, the an other device receiving CF-End frame 440, 442, 450, and/or 452 may be allowed contend for the wireless media, e.g., following the reception of the CF-End frames 440, 442, 450, and/or 452, e.g., at time 459, for example, instead of having to wait until end time 419.

Some demonstrative embodiments are described above with respect to the BRP responder, e.g., BRP responder 204 (FIG. 2), BRP responder 304 (FIG. 3), and/or BRP responder 404 (FIG. 4), transmitting a number of CF-End frames equal to the number of CF-End frames transmitted by the BRP initiator, e.g., BRP initiator 202 (FIG. 2), BRP initiator 302 (FIG. 3), and/or BRP initiator 304 (FIG. 4), for example, by transmitting a CF-End frame in response to each CF-End frame transmitted by the initiator.

In other embodiments, the number of CF-End frames transmitted by the BRP responder may be different from the number of CF-End frames transmitted by the BRP initiator, e.g., as described below.

In some demonstrative embodiments, the BRP responder may be configured to select not to transmit a CF-END frame in response to at least one CF-End frame transmitted by the BRP initiator.

In some demonstrative embodiments, the BRP responder may set a shortened duration in the last BRP packet transmitted by the BRP responder. According to these embodiments, the BRP responder may avoid transmitting a CF-End frame in response to the CF-end transmitted by the BRP initiator, e.g., since the shortened duration in the last duration in the last BRP packet transmitted by the BRP responder may enable a device receiving the last BRP packet to truncate the NAV asserted by the device.

Figure 5:
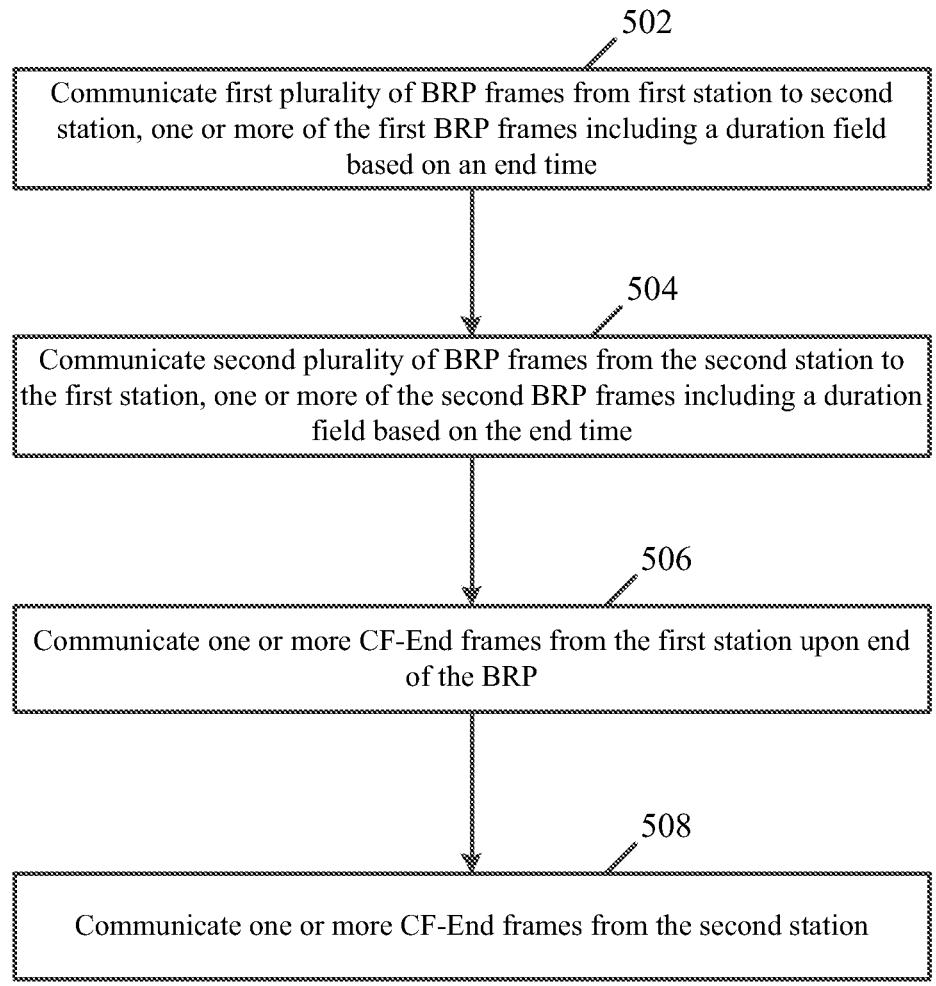
FIG. 5 is a schematic flow-chart illustration of a method of beamforming, in accordance with some demonstrative embodiments.

Reference is made to FIG. 5, which schematically illustrates a method of beamforming, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), a message processor, e.g., message processor 128 (FIG. 1) and/or message processor 158 (FIG. 1), a BRP initiator, e.g., BRP initiator 202 (FIG. 2), BRP initiator 302 (FIG. 3), and/or BRP initiator 402 (FIG. 4), and/or a BRP responder, e.g., BRP responder 204 (FIG. 2), BRP responder 304 (FIG. 3), and/or BRP responder 404 (FIG. 4).

As indicated at block 502, the method may include communicating a first plurality of BRP frames from a first wireless station to a second wireless station during a BRP. One or more one or more BRP frames of the first plurality of BRP frames may be, for example, according to an end time. For example, a BRP initiator, e.g., device 102 (FIG. 1), may transmit a first plurality of BRP frames including duration fields set according to an end time; and/or a BRP responder, e.g., device 140 (FIG. 1), may receive the first plurality of BRP frames including duration the fields according to the end time, e.g., as described above.

As indicated at block 504, the method may include communicating a second plurality of BRP frames from the second wireless station to the first wireless station during a BRP. One or more one or more BRP frames of the second plurality of BRP frames may include duration fields, which may be, for example, according to the end time. For example, the BRP responder, e.g., device 140 (FIG. 1), may transmit a second plurality of BRP frames including duration fields set according to the end time; and/or the BRP initiator, e.g., device 102 (FIG. 1), may receive the second plurality of BRP frames including duration the fields according to the end time, e.g., as described above.

As indicated at block 506, the method may include communicating one or more CF-End frames from the first wireless station, e.g., upon an end of the BRP. For example, the BRP initiator, e.g., device 102 (FIG. 1), may transmit one or more CF-End frames, e.g., at or after an end of the BRP; and/or a BRP responder, e.g., device 140 (FIG. 1), may receive one or more of the one or more CF-End frames from the BRP initiator, e.g., as described above.

As indicated at block 508, the method may include communicating one or more CF-End frames from the second wireless station, e.g., in response to one or more of the one or more CF-End frames from the BRP initiator. For example, the BRP responder, e.g., device 140 (FIG. 1), may transmit one or more CF-End frames, e.g., in response to one or more of the CF-End frames from the BRP initiator; and/or the BRP initiator, e.g., device 102 (FIG. 1), may receive one or more of the one or more CF-End frames from the BRP responder, e.g., as described above.

Figure 6:
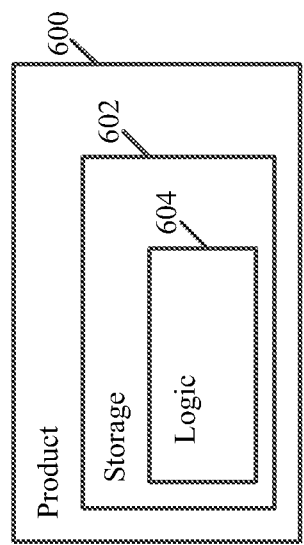
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), BRP initiators 202 (FIG. 2), 302 (FIG. 3), and/or 402 (FIG. 4), and/or BRP responders 204 (FIG. 2), 304 (FIG. 3), and/or 404 (FIG. 4), and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a first wireless station to process transmission of a first plurality of Beam Refinement Phase (BRP) frames to a second wireless station during a BRP, one or more duration fields of one or more respective BRP frames of the first plurality of BRP frames being according to an end time; and process reception of a second plurality of BRP frames from the second wireless station during the BRP, one or more duration fields of one or more respective BRP frames of the second plurality of BRP frames being according to the end time.

Example 2 includes the subject matter of Example 1, and optionally, wherein a duration field of each BRP frame of the first plurality of BRP frames is according to the end time.

Example 3 includes the subject matter of Example 1 or 2, and optionally, wherein a duration field of each BRP frame of the second plurality of BRP frames is according to the end time.

Example 4 includes the subject matter of Example 1 or 2, and optionally, wherein a duration filed of a last BRP frame of the second plurality of BRP frames is according to a time before the end time.

Example 5 includes the subject matter of any one of Examples 1-4, and optionally, being configured to cause the first wireless station to process transmission of at least one Contention Free End (CF-End) frame upon an end of the BRP.

Example 6 includes the subject matter of Example 5, and optionally, being configured to cause the first wireless station to process transmission of a single CF-End frame.

Example 7 includes the subject matter of Example 5, and optionally, being configured to cause the first wireless station to process transmission of a plurality of CF-End frames.

Example 8 includes the subject matter of Example 7, and optionally, wherein a number of CF-End frames in the plurality of CF-End frames is equal to or less than a number of the first plurality of BRP frames.

Example 9 includes the subject matter of Example 7 or 8, and optionally, wherein a number of CF-End frames in the plurality of CF-End frames is equal to or greater than a number of different directions of transmission of the first plurality of BRP frames.

Example 10 includes the subject matter of any one of Examples 7-9, and optionally, wherein a CF-End frame of the plurality of CF-end frames comprises a duration field to cover a duration, which is based on a number of CF-End frames in the plurality of CF-End frames.

Example 11 includes the subject matter of any one of Examples 7-10, and optionally, being configured to cause the first wireless station to process transmission of a first CF-End frame in a first direction of transmission of a first BRP frame of the first plurality of BRP frames, and a second CF-End frame in a second direction of transmission of a second BRP frame of the first plurality of BRP frames.

Example 12 includes the subject matter of any one of Examples 1-11, and optionally, wherein the BRP is within a Transmit Opportunity (TxOP), and the end time is before an end of the TxOP.

Example 13 includes the subject matter of any one of Examples 1-12, and optionally, wherein the end time comprises a time at or after an end of the BRP.

Example 14 includes the subject matter of any one of Examples 1-13, and optionally, wherein the end time comprises a time at or after a maximal expected duration of the BRP.

Example 15 includes the subject matter of any one of Examples 1-14, and optionally, being configured to cause the first wireless station to perform the functionality of a BRP initiator.

Example 16 includes the subject matter of any one of Examples 1-15, and optionally, wherein the first wireless station is a directional multi-gigabit (DMG) station.

Example 17 includes the subject matter of any one of Examples 1-16, and optionally, comprising one or more antennas, a memory and a processor.

Example 18 includes an apparatus comprising circuitry configured to cause a first wireless station to process reception of a first plurality of Beam Refinement Phase (BRP) frames from a second wireless station during a BRP, one or more duration fields of one or more respective BRP frames of the first plurality of BRP frames being according to an end time; and process transmission of a second plurality of BRP frames to the second wireless station during the BRP, one or more duration fields of one or more respective BRP frames of the second plurality of BRP frames being according to the end time.

Example 19 includes the subject matter of Example 18, and optionally, wherein a duration field of each BRP frame of the first plurality of BRP frames is according to the end time.

Example 20 includes the subject matter of Example 18 or 19, and optionally, wherein a duration field of each BRP frame of the second plurality of BRP frames is according to the end time.

Example 21 includes the subject matter of Example 18 or 19, and optionally, wherein a duration filed of a last BRP frame of the second plurality of BRP frames is according to a time before the end time.

Example 22 includes the subject matter of any one of Examples 18-21, and optionally, being configured to cause the first wireless station to process transmission of at least one Contention Free End (CF-End) frame upon an end of the BRP.

Example 23 includes the subject matter of Example 22, and optionally, being configured to cause the first wireless station to process transmission of a single CF-End frame.

Example 24 includes the subject matter of Example 22, and optionally, being configured to cause the first wireless station to process transmission of a plurality of CF-End frames.

Example 25 includes the subject matter of Example 24, and optionally, wherein a number of CF-End frames in the plurality of CF-End frames is equal to or less than a number of the second plurality of BRP frames.

Example 26 includes the subject matter of Example 24 or 25, and optionally, wherein a number of CF-End frames in the plurality of CF-End frames is equal to or greater than a number of different directions of transmission of the second plurality of BRP frames.

Example 27 includes the subject matter of any one of Examples 24-26, and optionally, wherein a CF-End frame of the plurality of CF-end frames comprises a duration field to cover a duration, which is based on a number of CF-End frames in the plurality of CF-End frames.

Example 28 includes the subject matter of any one of Examples 24-27, and optionally, being configured to cause the first wireless station to process transmission of a first CF-End frame in a first direction of transmission of a first BRP frame of the second plurality of BRP frames, and a second CF-End frame in a second direction of transmission of a second BRP frame of the second plurality of BRP frames.

Example 29 includes the subject matter of any one of Examples 18-28, and optionally, wherein the BRP is within a Transmit Opportunity (TxOP), and the end time is before an end of the TxOP.

Example 30 includes the subject matter of any one of Examples 18-29, and optionally, wherein the end time comprises a time at or after an end of the BRP.

Example 31 includes the subject matter of any one of Examples 18-30, and optionally, wherein the end time comprises a time at or after a maximal expected duration of the BRP.

Example 32 includes the subject matter of any one of Examples 18-31, and optionally, being configured to cause the first wireless station to perform the functionality of a BRP responder.

Example 33 includes the subject matter of any one of Examples 18-32, and optionally, wherein the first wireless station is a directional multi-gigabit (DMG) station.

Example 34 includes the subject matter of any one of Examples 18-33, and optionally, comprising one or more antennas, a memory and a processor.

Example 35 includes a method to be performed at a first wireless station, the method comprising processing transmission of a first plurality of Beam Refinement Phase (BRP) frames to a second wireless station during a BRP, one or more duration fields of one or more respective BRP frames of the first plurality of BRP frames being according to an end time; and processing reception of a second plurality of BRP frames from the second wireless station during the BRP, one or more duration fields of one or more respective BRP frames of the second plurality of BRP frames being according to the end time.

Example 36 includes the subject matter of Example 35, and optionally, wherein a duration field of each BRP frame of the first plurality of BRP frames is according to the end time.

Example 37 includes the subject matter of Example 35 or 36, and optionally, wherein a duration field of each BRP frame of the second plurality of BRP frames is according to the end time.

Example 38 includes the subject matter of Example 35 or 36, and optionally, wherein a duration filed of a last BRP frame of the second plurality of BRP frames is according to a time before the end time.

Example 39 includes the subject matter of any one of Examples 35-38, and optionally, comprising processing transmission of at least one Contention Free End (CF-End) frame upon an end of the BRP.

Example 40 includes the subject matter of Example 39, and optionally, comprising processing transmission of a single CF-End frame.

Example 41 includes the subject matter of Example 39, and optionally, comprising processing transmission of a plurality of CF-End frames.

Example 42 includes the subject matter of Example 41, and optionally, wherein a number of CF-End frames in the plurality of CF-End frames is equal to or less than a number of the first plurality of BRP frames.

Example 43 includes the subject matter of Example 41 or 42, and optionally, wherein a number of CF-End frames in the plurality of CF-End frames is equal to or greater than a number of different directions of transmission of the first plurality of BRP frames.

Example 44 includes the subject matter of any one of Examples 41-43, and optionally, wherein a CF-End frame of the plurality of CF-end frames comprises a duration field to cover a duration, which is based on a number of CF-End frames in the plurality of CF-End frames.

Example 45 includes the subject matter of any one of Examples 41-44, and optionally, comprising processing transmission of a first CF-End frame in a first direction of transmission of a first BRP frame of the first plurality of BRP frames, and a second CF-End frame in a second direction of transmission of a second BRP frame of the first plurality of BRP frames.

Example 46 includes the subject matter of any one of Examples 35-45, and optionally, wherein the BRP is within a Transmit Opportunity (TxOP), and the end time is before an end of the TxOP.

Example 47 includes the subject matter of any one of Examples 35-46, and optionally, wherein the end time comprises a time at or after an end of the BRP.

Example 48 includes the subject matter of any one of Examples 35-47, and optionally, wherein the end time comprises a time at or after a maximal expected duration of the BRP.

Example 49 includes the subject matter of any one of Examples 35-48, and optionally, wherein the first wireless station is a BRP initiator.

Example 50 includes the subject matter of any one of Examples 35-49, and optionally, wherein the first wireless station is a directional multi-gigabit (DMG) station.

Example 51 includes a method to be performed at a first wireless station, the method comprising processing reception of a first plurality of Beam Refinement Phase (BRP) frames from a second wireless station during a BRP, one or more duration fields of one or more respective BRP frames of the first plurality of BRP frames being according to an end time; and processing transmission of a second plurality of BRP frames to the second wireless station during the BRP, one or more duration fields of one or more respective BRP frames of the second plurality of BRP frames being according to the end time.

Example 52 includes the subject matter of Example 51, and optionally, wherein a duration field of each BRP frame of the first plurality of BRP frames is according to the end time.

Example 53 includes the subject matter of Example 51 or 52, and optionally, wherein a duration field of each BRP frame of the second plurality of BRP frames is according to the end time.

Example 54 includes the subject matter of Example 51 or 52, and optionally, wherein a duration filed of a last BRP frame of the second plurality of BRP frames is according to a time before the end time.

Example 55 includes the subject matter of any one of Examples 51-54, and optionally, comprising processing transmission of at least one Contention Free End (CF-End) frame upon an end of the BRP.

Example 56 includes the subject matter of Example 55, and optionally, comprising processing transmission of a single CF-End frame.

Example 57 includes the subject matter of Example 55, and optionally, comprising processing transmission of a plurality of CF-End frames.

Example 58 includes the subject matter of Example 57, and optionally, wherein a number of CF-End frames in the plurality of CF-End frames is equal to or less than a number of the second plurality of BRP frames.

Example 59 includes the subject matter of Example 57 or 58, and optionally, wherein a number of CF-End frames in the plurality of CF-End frames is equal to or greater than a number of different directions of transmission of the second plurality of BRP frames.

Example 60 includes the subject matter of any one of Examples 57-59, and optionally, wherein a CF-End frame of the plurality of CF-end frames comprises a duration field to cover a duration, which is based on a number of CF-End frames in the plurality of CF-End frames.

Example 61 includes the subject matter of any one of Examples 57-60, and optionally, comprising processing transmission of a first CF-End frame in a first direction of transmission of a first BRP frame of the second plurality of BRP frames, and a second CF-End frame in a second direction of transmission of a second BRP frame of the second plurality of BRP frames.

Example 62 includes the subject matter of any one of Examples 51-61, and optionally, wherein the BRP is within a Transmit Opportunity (TxOP), and the end time is before an end of the TxOP.

Example 63 includes the subject matter of any one of Examples 51-62, and optionally, wherein the end time comprises a time at or after an end of the BRP.

Example 64 includes the subject matter of any one of Examples 51-63, and optionally, wherein the end time comprises a time at or after a maximal expected duration of the BRP.

Example 65 includes the subject matter of any one of Examples 51-64, and optionally, wherein the first wireless station is a BRP responder.

Example 66 includes the subject matter of any one of Examples 51-65, and optionally, wherein the first wireless station is a directional multi-gigabit (DMG) station.

Example 67 includes a product comprising one or more tangible computer-readable non-transitory storage media comprising computer-executable instructions operable to, when executed by at least one computer processor, enable the at least one computer processor to implement one or more operations at a first wireless station, the operations comprising processing transmission of a first plurality of Beam Refinement Phase (BRP) frames to a second wireless station during a BRP, one or more duration fields of one or more respective BRP frames of the first plurality of BRP frames being according to an end time; and processing reception of a second plurality of BRP frames from the second wireless station during the BRP, one or more duration fields of one or more respective BRP frames of the second plurality of BRP frames being according to the end time.

Example 68 includes the subject matter of Example 67, and optionally, wherein a duration field of each BRP frame of the first plurality of BRP frames is according to the end time.

Example 69 includes the subject matter of Example 67 or 68, and optionally, wherein a duration field of each BRP frame of the second plurality of BRP frames is according to the end time.

Example 70 includes the subject matter of Example 67 or 68, and optionally, wherein a duration filed of a last BRP frame of the second plurality of BRP frames is according to a time before the end time.

Example 71 includes the subject matter of any one of Examples 67-70, and optionally, wherein the operations comprise processing transmission of at least one Contention Free End (CF-End) frame upon an end of the BRP.

Example 72 includes the subject matter of Example 71, and optionally, wherein the operations comprise processing transmission of a single CF-End frame.

Example 73 includes the subject matter of Example 71, and optionally, wherein the operations comprise processing transmission of a plurality of CF-End frames.

Example 74 includes the subject matter of Example 73, and optionally, wherein a number of CF-End frames in the plurality of CF-End frames is equal to or less than a number of the first plurality of BRP frames.

Example 75 includes the subject matter of Example 73 or 74, and optionally, wherein a number of CF-End frames in the plurality of CF-End frames is equal to or greater than a number of different directions of transmission of the first plurality of BRP frames.

Example 76 includes the subject matter of any one of Examples 73-75, and optionally, wherein a CF-End frame of the plurality of CF-end frames comprises a duration field to cover a duration, which is based on a number of CF-End frames in the plurality of CF-End frames.

Example 77 includes the subject matter of any one of Examples 73-76, and optionally, wherein the operations comprise processing transmission of a first CF-End frame in a first direction of transmission of a first BRP frame of the first plurality of BRP frames, and a second CF-End frame in a second direction of transmission of a second BRP frame of the first plurality of BRP frames.

Example 78 includes the subject matter of any one of Examples 67-77, and optionally, wherein the BRP is within a Transmit Opportunity (TxOP), and the end time is before an end of the TxOP.

Example 79 includes the subject matter of any one of Examples 67-78, and optionally, wherein the end time comprises a time at or after an end of the BRP.

Example 80 includes the subject matter of any one of Examples 67-79, and optionally, wherein the end time comprises a time at or after a maximal expected duration of the BRP.

Example 81 includes the subject matter of any one of Examples 67-80, and optionally, wherein the first wireless station is a BRP initiator.

Example 82 includes the subject matter of any one of Examples 67-81, and optionally, wherein the first wireless station is a directional multi-gigabit (DMG) station.

Example 83 includes a product comprising one or more tangible computer-readable non-transitory storage media comprising computer-executable instructions operable to, when executed by at least one computer processor, enable the at least one computer processor to implement one or more operations at a first wireless station, the operations comprising processing reception of a first plurality of Beam Refinement Phase (BRP) frames from a second wireless station during a BRP, one or more duration fields of one or more respective BRP frames of the first plurality of BRP frames being according to an end time; and processing transmission of a second plurality of BRP frames to the second wireless station during the BRP, one or more duration fields of one or more respective BRP frames of the second plurality of BRP frames being according to the end time.

Example 84 includes the subject matter of Example 83, and optionally, wherein a duration field of each BRP frame of the first plurality of BRP frames is according to the end time.

Example 85 includes the subject matter of Example 83 or 84, and optionally, wherein a duration field of each BRP frame of the second plurality of BRP frames is according to the end time.

Example 86 includes the subject matter of Example 83 or 84, and optionally, wherein a duration filed of a last BRP frame of the second plurality of BRP frames is according to a time before the end time.

Example 87 includes the subject matter of any one of Examples 83-86, and optionally, wherein the operations comprise processing transmission of at least one Contention Free End (CF-End) frame upon an end of the BRP.

Example 88 includes the subject matter of Example 87, and optionally, wherein the operations comprise processing transmission of a single CF-End frame.

Example 89 includes the subject matter of Example 87, and optionally, wherein the operations comprise processing transmission of a plurality of CF-End frames.

Example 90 includes the subject matter of Example 89, and optionally, wherein a number of CF-End frames in the plurality of CF-End frames is equal to or less than a number of the second plurality of BRP frames.

Example 91 includes the subject matter of Example 89 or 90, and optionally, wherein a number of CF-End frames in the plurality of CF-End frames is equal to or greater than a number of different directions of transmission of the second plurality of BRP frames.

Example 92 includes the subject matter of any one of Examples 89-91, and optionally, wherein a CF-End frame of the plurality of CF-end frames comprises a duration field to cover a duration, which is based on a number of CF-End frames in the plurality of CF-End frames.

Example 93 includes the subject matter of any one of Examples 89-92, and optionally, wherein the operations comprise processing transmission of a first CF-End frame in a first direction of transmission of a first BRP frame of the second plurality of BRP frames, and a second CF-End frame in a second direction of transmission of a second BRP frame of the second plurality of BRP frames.

Example 94 includes the subject matter of any one of Examples 83-93, and optionally, wherein the BRP is within a Transmit Opportunity (TxOP), and the end time is before an end of the TxOP.

Example 95 includes the subject matter of any one of Examples 83-94, and optionally, wherein the end time comprises a time at or after an end of the BRP.

Example 96 includes the subject matter of any one of Examples 83-95, and optionally, wherein the end time comprises a time at or after a maximal expected duration of the BRP.

Example 97 includes the subject matter of any one of Examples 83-96, and optionally, wherein the first wireless station is a BRP responder.

Example 98 includes the subject matter of any one of Examples 83-97, and optionally, wherein the first wireless station is a directional multi-gigabit (DMG) station.

Example 99 includes an apparatus of wireless communication by a first wireless station, the apparatus comprising means for processing transmission of a first plurality of Beam Refinement Phase (BRP) frames to a second wireless station during a BRP, one or more duration fields of one or more respective BRP frames of the first plurality of BRP frames being according to an end time; and means for processing reception of a second plurality of BRP frames from the second wireless station during the BRP, one or more duration fields of one or more respective BRP frames of the second plurality of BRP frames being according to the end time.

Example 100 includes the subject matter of Example 99, and optionally, wherein a duration field of each BRP frame of the first plurality of BRP frames is according to the end time.

Example 101 includes the subject matter of Example 99 or 100, and optionally, wherein a duration field of each BRP frame of the second plurality of BRP frames is according to the end time.

Example 102 includes the subject matter of Example 99 or 100, and optionally, wherein a duration filed of a last BRP frame of the second plurality of BRP frames is according to a time before the end time.

Example 103 includes the subject matter of any one of Examples 99-102, and optionally, comprising means for processing transmission of at least one Contention Free End (CF-End) frame upon an end of the BRP.

Example 104 includes the subject matter of Example 103, and optionally, comprising means for processing transmission of a single CF-End frame.

Example 105 includes the subject matter of Example 103, and optionally, comprising means for processing transmission of a plurality of CF-End frames.

Example 106 includes the subject matter of Example 105, and optionally, wherein a number of CF-End frames in the plurality of CF-End frames is equal to or less than a number of the first plurality of BRP frames.

Example 107 includes the subject matter of Example 105 or 106, and optionally, wherein a number of CF-End frames in the plurality of CF-End frames is equal to or greater than a number of different directions of transmission of the first plurality of BRP frames.

Example 108 includes the subject matter of any one of Examples 105-107, and optionally, wherein a CF-End frame of the plurality of CF-end frames comprises a duration field to cover a duration, which is based on a number of CF-End frames in the plurality of CF-End frames.

Example 109 includes the subject matter of any one of Examples 105-108, and optionally, comprising means for processing transmission of a first CF-End frame in a first direction of transmission of a first BRP frame of the first plurality of BRP frames, and a second CF-End frame in a second direction of transmission of a second BRP frame of the first plurality of BRP frames.

Example 110 includes the subject matter of any one of Examples 99-109, and optionally, wherein the BRP is within a Transmit Opportunity (TxOP), and the end time is before an end of the TxOP.

Example 111 includes the subject matter of any one of Examples 99-110, and optionally, wherein the end time comprises a time at or after an end of the BRP.

Example 112 includes the subject matter of any one of Examples 99-111, and optionally, wherein the end time comprises a time at or after a maximal expected duration of the BRP.

Example 113 includes the subject matter of any one of Examples 99-112, and optionally, wherein the first wireless station is a BRP initiator.

Example 114 includes the subject matter of any one of Examples 99-113, and optionally, wherein the first wireless station is a directional multi-gigabit (DMG) station.

Example 115 includes an apparatus of wireless communication by a first wireless station, the apparatus comprising means for processing reception of a first plurality of Beam Refinement Phase (BRP) frames from a second wireless station during a BRP, one or more duration fields of one or more respective BRP frames of the first plurality of BRP frames being according to an end time; and means for processing transmission of a second plurality of BRP frames to the second wireless station during the BRP, one or more duration fields of one or more respective BRP frames of the second plurality of BRP frames being according to the end time.

Example 116 includes the subject matter of Example 115, and optionally, wherein a duration field of each BRP frame of the first plurality of BRP frames is according to the end time.

Example 117 includes the subject matter of Example 115 or 116, and optionally, wherein a duration field of each BRP frame of the second plurality of BRP frames is according to the end time.

Example 118 includes the subject matter of Example 115 or 116, and optionally, wherein a duration filed of a last BRP frame of the second plurality of BRP frames is according to a time before the end time.

Example 119 includes the subject matter of any one of Examples 115-118, and optionally, comprising means for processing transmission of at least one Contention Free End (CF-End) frame upon an end of the BRP.

Example 120 includes the subject matter of Example 119, and optionally, comprising means for processing transmission of a single CF-End frame.

Example 121 includes the subject matter of Example 119, and optionally, comprising means for processing transmission of a plurality of CF-End frames.

Example 122 includes the subject matter of Example 121, and optionally, wherein a number of CF-End frames in the plurality of CF-End frames is equal to or less than a number of the second plurality of BRP frames.

Example 123 includes the subject matter of Example 121 or 122, and optionally, wherein a number of CF-End frames in the plurality of CF-End frames is equal to or greater than a number of different directions of transmission of the second plurality of BRP frames.

Example 124 includes the subject matter of any one of Examples 121-123, and optionally, wherein a CF-End frame of the plurality of CF-end frames comprises a duration field to cover a duration, which is based on a number of CF-End frames in the plurality of CF-End frames.

Example 125 includes the subject matter of any one of Examples 121-124, and optionally, comprising means for processing transmission of a first CF-End frame in a first direction of transmission of a first BRP frame of the second plurality of BRP frames, and a second CF-End frame in a second direction of transmission of a second BRP frame of the second plurality of BRP frames.

Example 126 includes the subject matter of any one of Examples 115-125, and optionally, wherein the BRP is within a Transmit Opportunity (TxOP), and the end time is before an end of the TxOP.

Example 127 includes the subject matter of any one of Examples 115-126, and optionally, wherein the end time comprises a time at or after an end of the BRP.

Example 128 includes the subject matter of any one of Examples 115-127, and optionally, wherein the end time comprises a time at or after a maximal expected duration of the BRP.

Example 129 includes the subject matter of any one of Examples 115-128, and optionally, wherein the first wireless station is a BRP responder.

Example 130 includes the subject matter of any one of Examples 115-129, and optionally, wherein the first wireless station is a directional multi-gigabit (DMG) station.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a memory; and
   a processor configured to cause a first wireless station to:
      transmit a first plurality of Beam Refinement Phase (BRP) frames to a second wireless station during a BRP in a Transmit Opportunity (TxOP), one or more duration field values in one or more respective BRP frames of said first plurality of BRP frames are based on an end time, which is not after an end of the TxOP; and
      receive a second plurality of BRP frames from the second wireless station during the BRP, one or more duration field values in one or more respective BRP frames of said second plurality of BRP frames are based on said end time.

2. The apparatus of claim 1, wherein each duration field value in said first plurality of BRP frames is according to the end time.

3. The apparatus of claim 1, wherein a duration field value in a last BRP frame of said second plurality of BRP frames is according to a time before the end time.

4. The apparatus of claim 1 configured to cause said first wireless station to transmit at least one Contention Free End (CF-End) frame upon an end of the BRP.

5. The apparatus of claim 4 configured to cause said first wireless station to transmit a plurality of CF-End frames.

6. The apparatus of claim 5, wherein a number of CF-End frames in said plurality of CF-End frames is equal to or less than a number of said first plurality of BRP frames.

7. The apparatus of claim 5, wherein a number of CF-End frames in said plurality of CF-End frames is equal to or greater than a number of different directions of transmission of said first plurality of BRP frames.

8. The apparatus of claim 5, wherein a CF-End frame of said plurality of CF-end frames comprises a duration field to cover a duration, which is based on a number of CF-End frames in said plurality of CF-End frames.

9. The apparatus of claim 5 configured to cause said first wireless station to transmit a first CF-End frame in a first direction of transmission of a first BRP frame of said first plurality of BRP frames, and a second CF-End frame in a second direction of transmission of a second BRP frame of said first plurality of BRP frames.

10. The apparatus of claim 1, wherein the end time is before an end of the TxOP.

11. The apparatus of claim 1, wherein the end time comprises a time at or after an end of said BRP.

12. The apparatus of claim 1 configured to cause said first wireless station to perform a role of a BRP initiator.

13. The apparatus of claim 1, wherein the first wireless station is a directional multi-gigabit (DMG) station.

14. The apparatus of claim 1 comprising one or more antenna.

15. An apparatus comprising:
    a memory; and
    a processor configured to cause a first wireless station to:
       receive a first plurality of Beam Refinement Phase (BRP) frames from a second wireless station during a BRP in a Transmit Opportunity (TxOP), one or more duration field values in one or more respective BRP frames of said first plurality of BRP frames are based on an end time, which is not after an end of the TxOP; and
       transmit a second plurality of BRP frames to the second wireless station during the BRP, one or more duration field values in one or more respective BRP frames of said second plurality of BRP frames are based on said end time.

16. The apparatus of claim 15, wherein a duration field value in a last BRP frame of said second plurality of BRP frames is according to a time before the end time.

17. The apparatus of claim 15 configured to cause said first wireless station to transmit at least one Contention Free End (CF-End) frame upon an end of the BRP.

18. The apparatus of claim 17 configured to cause said first wireless station to transmit a plurality of CF-End frames.

19. The apparatus of claim 18 configured to cause said first wireless station to transmit a first CF-End frame in a first direction of transmission of a first BRP frame of said second plurality of BRP frames, and a second CF-End frame in a second direction of transmission of a second BRP frame of said second plurality of BRP frames.

20. The apparatus of claim 15 comprising one or more antennas.

21. A product comprising one or more tangible computer-readable non-transitory storage media comprising computer-executable instructions operable to, when executed by at least one processor, enable the at least one processor to cause a first wireless station to:
    transmit a first plurality of Beam Refinement Phase (BRP) frames to a second wireless station during a BRP in a Transmit Opportunity (TxOP), one or more duration field values in one or more respective BRP frames of said first plurality of BRP frames are based on an end time, which is not after an end of the TxOP; and
    receive a second plurality of BRP frames from the second wireless station during the BRP, one or more duration field values in one or more respective BRP frames of said second plurality of BRP frames are based on said end time.

22. The product of claim 21, wherein the instructions, when executed, cause the first wireless station to transmit at least one Contention Free End (CF-End) frame upon an end of the BRP.

23. The product of claim 21, wherein the end time is before an end of the TxOP.

24. A product comprising one or more tangible computer-readable non-transitory storage media comprising computer-executable instructions operable to, when executed by at least one processor, enable the at least one processor to cause a first wireless station to:

receive a first plurality of Beam Refinement Phase (BRP) frames from a second wireless station during a BRP in a Transmit Opportunity (TxOP), one or more duration field values in one or more respective BRP frames of said first plurality of BRP frames are based on an end time, which is not after an end of the TxOP; and transmit a second plurality of BRP frames to the second wireless station during the BRP, one or more duration field values in one or more respective BRP frames of said second plurality of BRP frames are based on said end time.

25. The product of claim 24, wherein the instructions, when executed, cause the first wireless station to transmit at least one Contention Free End (CF-End) frame upon an end of the BRP.

\* \* \* \* \*